(12) United States Patent
Van de Velde et al.

(10) Patent No.: US 6,725,779 B2
(45) Date of Patent: Apr. 27, 2004

(54) MULTI-LEVEL PRINTING PROCESS REDUCING ALIASING IN GRAPHICS

(75) Inventors: Koen Van de Velde, Duffel (BE); Luc Minnebo, Brasschaat (BE); Paul Delabastita, Antwerp (BE)

(73) Assignee: Agfa-Gevaert, Mortsel (BE)

( * ) Notice: Subject to any disclaimer, the term of this patent is extended or adjusted under 35 U.S.C. 154(b) by 141 days.

(21) Appl. No.: 09/981,056

(22) Filed: Oct. 16, 2001

(65) Prior Publication Data

US 2002/0108521 A1 Aug. 15, 2002

Related U.S. Application Data

(60) Provisional application No. 60/245,736, filed on Nov. 3, 2000.

(51) Int. Cl.[7] ............................................. B41C 47/60
(52) U.S. Cl. .................. 101/483; 101/485; 358/455; 382/266
(58) Field of Search ......................... 101/483, 484, 101/485; 358/455, 488, 1.9; 382/266

(56) References Cited

U.S. PATENT DOCUMENTS

| | | | |
|---|---|---|---|
| 4,851,825 A | * 7/1989 | Naiman | 345/596 |
| 5,191,444 A | * 3/1993 | Harada et al. | 358/3.21 |
| 5,450,531 A | * 9/1995 | Ng et al. | 382/266 |
| 5,455,681 A | 10/1995 | Ng | 358/298 |
| 5,862,257 A | 1/1999 | Sekine et al. | 382/199 |

FOREIGN PATENT DOCUMENTS

| | | | |
|---|---|---|---|
| EP | 0 651 557 A1 | 5/1995 | |
| EP | 0786757 | 7/1997 | |
| EP | 1 199 676 A1 | 4/2002 | |
| GB | WO 9612251 A | * 4/1996 | G06K/15/02 |
| GB | 2 294 427 A | 5/1996 | |
| JP | 2000354165 A | * 12/2000 | H04N/1/405 |
| JP | 2001117549 A | * 4/2001 | G09G/5/28 |

* cited by examiner

Primary Examiner—Stephen R. Funk
Assistant Examiner—Minh Chau
(74) Attorney, Agent, or Firm—Grant Houston; Robert Sabourin

(57) ABSTRACT

A multi-level printing process using a printer by converting electronic page data to multi-level bitmap data with a specific number of gradation levels Nlev at a specified spatial resolution higher than that of the printer; converting the multi-level bitmap data to a lower spatial resolution; reducing the number of gradation levels by a processing technique to some lower number Nlevp giving a second multi-level bitmap; and printing the multi-level output bitmap by a printer having at least Nlevp different gradation levels at a single pixel location.

19 Claims, 7 Drawing Sheets

Fig. 7a text

Fig. 7b text

Fig. 7c text

MULTI-LEVEL PRINTING PROCESS REDUCING ALIASING IN GRAPHICS

CROSS REFERENCE TO RELATED APPLICATIONS

This application claims the benefit of under 35 U.S.C. §119(e) for U.S. Provisional Patent Application Ser. No. 60/245,736 filed on Nov. 3, 2000.

FIELD OF THE INVENTION

This invention relates to systems and procedures for printing documents. These documents can contain all types of visual information, such as text, graphics, images, etc., further commonly referred to as "image"

BACKGROUND OF THE INVENTION

A well-known problem that is common to all recording systems, that convert image data into discretised pixel information, is the occurrence of reconstruction errors, commonly called 'aliasing'. It results in jagged edges at lines or curves that are not aligned with the discrete pixel grid of the recording apparatus or printer.

This problem can be cured in two ways. The first one is to increase the spatial resolution of the recording device. This is often a technically difficult and costly solution.

A second approach, and this is the approach to which the present invention relates, is to trade spatial resolution with tonal resolution in order to improve the visual quality.

This approach is common for font rendering on computer displays. Here black pixels are surrounded by grey pixels. This results in visual smoothing of the edges, rendering the edges in a way more pleasing to the human eye.

A procedure is disclosed that creates multi-level gradation data from an abstract page description to achieve a similar result. Most documents to be printed contain a mixture of text, graphics and images and are given in the form of an page description. These documents may be PDF documents, PostScript™ files, MS-Office™ documents and so on. We have found that spatial resolution and tonal resolution are to some extent interchangeable and that lack of spatial resolution can be compensated by improved tonal resolution. The use of multiple gradation levels enhances the tonal resolution in portions of the document where the data is highly discretised, such as text, drawings, etc.

This technique requires that the recording engine has a means of rendering more than two different levels of grey or some other color, i.e. more than 0% ink and 100% ink. However most ink-jet and bubble-jet printing devices can only deliver fixed-size drops of ink making the printing of multi-level pixel data without reducing the spatial resolution impossible.

Solutions to this problem have been proposed in terms of using multiple inks of the same color, but different density. We refer to the documents WO 96/12251, EP 0 850 767 A1 and U.S. Pat. No. 5,966,507 herein incorporated by reference. A method of surrounding black pixels by grey pixels for use in a 3-level electrophotographic printer was disclosed in EP 0 082 281 A1 herein incorporated by reference.

Further developments in electrophotographic printing allow the pixel size to be adapted. Procedures to enhance the resolution in that way, working by comparing the neighbourhood of a pixel with pre-existing templates, are described in U.S. Pat. No. 4,847,641, U.S. Pat. No. 5,193,008 and U.S. Pat. No. 5,134,495 herein incorporated by reference.

This invention however differs from the above approaches in that it combines a number of image processing steps, different from the ones described in the above-cited references, with a technology to record multiple gradation levels at a single pixel, with the same ink.

OBJECTS OF THE INVENTION

It is an object of the present invention to provide a printing process in which the visual quality of the obtained image is enhanced.

It is a further object to enable the softening of jagged edges at lines or curves that are not aligned with the discrete pixel grid of the recording apparatus or printer.

SUMMARY OF THE INVENTION

The above mentioned objects are realised by a method having the specific features set out in claim 1. Specific features for preferred embodiments of the invention are set out in the dependent claims. These objects are also realised by a system having specific features of claim 11.

The above objects are mainly released by combining:

a process for printing multiple gradation levels at a single pixel, with the same ink and a procedure for obtaining multi-level gradation data from an abstract page description of the document to be printed.

An image as referred to hereinafter can be anything on a document such as text, graphics, images, etc. . . . The page data describes the layout and content of the page to be reproduced, this data can be supplied in various formats.

Rendering an image is the process of reproducing the image or document on a medium or on a display screen.

A bitmap is typically a two-dimensional array of pixels. Each pixel represents a small square or rectangular portion of an image. In grey images, each pixel may be represented by one value e.g. in the range of 0–255. Such a bitmap is called a multi-level bitmap as every pixel in the bitmap may take one of several available density values or gradation levels.

In color images, each pixel is typically represented by three or more color components. For each color component of each pixel a value is required. In a system with three color components, where each color pixel value is represented by 8 bits, each color pixel may take 256 different values for each component. Consequently each pixel may take $256^3$= 16,777,216 possible values. Besides the three color values, extra bitmap values can be calculated for the black color component. The output bitmap is a bitmap which is sent to the printer for rendering of the image by the printer.

The resolution of an image is the number of pixels used to represent a linear size of the image. For a physical representation of an image this is expressed as the number of pixels or dots per unit of length, e.g. 16 dots/mm or 400 dots/inch(dpi). For electronic image data, the resolution can be defined as the physical resolution if the image would be rendered on a certain size.

BRIEF DESCRIPTION OF THE DRAWINGS

FIG. 7a shows the text printed without making use of the present invention.

FIG. 7b shows the text printed at higher resolution.

FIG. 7c shows the text after an anti-aliasing procedure according to the invention.

DETAILED DESCRIPTION OF THE INVENTION

Figure 1:
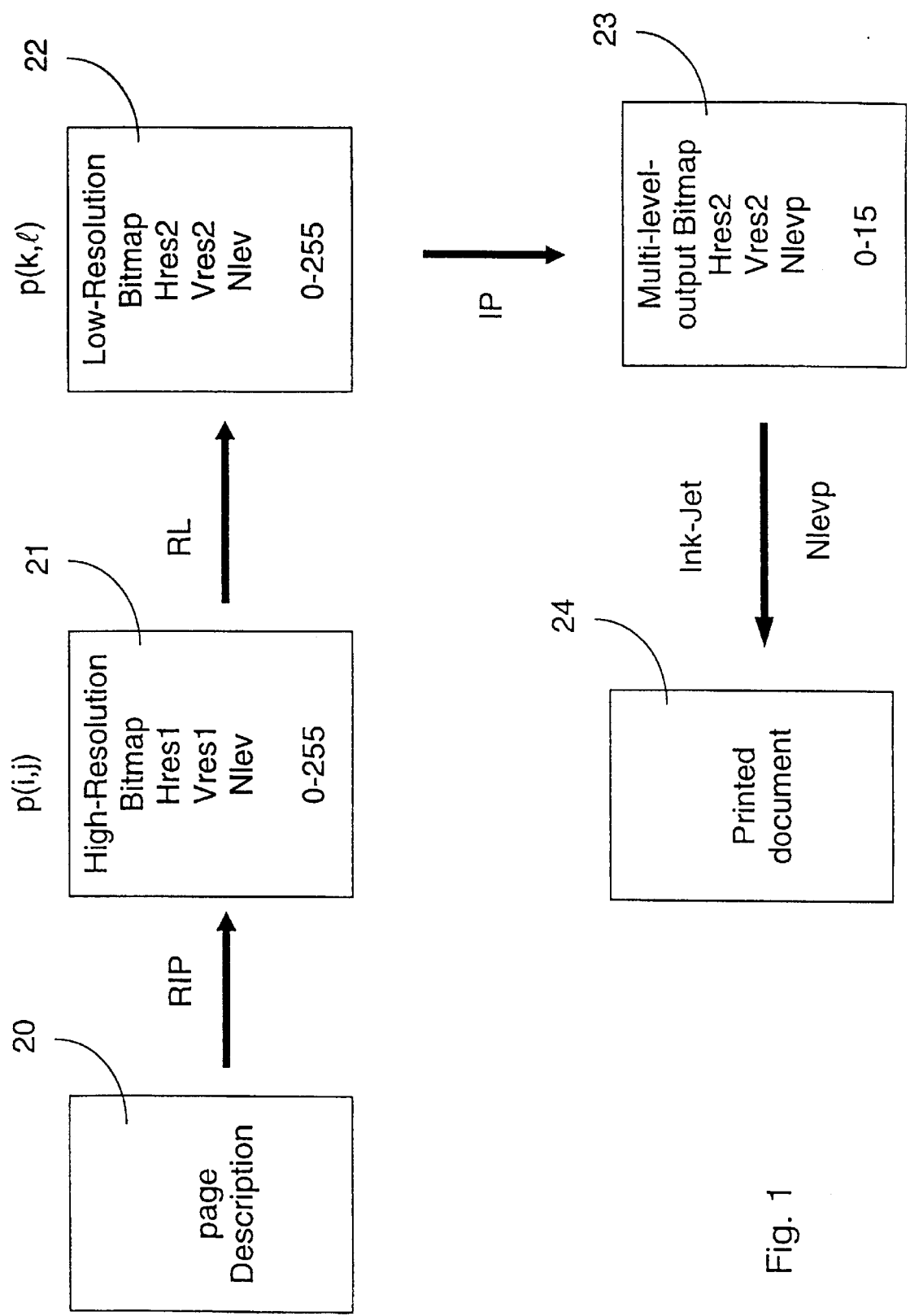
FIG. 1 shows various steps in a printing process according to the invention.

According to FIG. 1 the page description 20 to be printed is processed by a Raster Image Processor (RIP) to produce high-resolution multi-level bitmap data 21 at a horizontal resolution Hres1, a vertical resolution Vres1, and a number of gradation levels Nlev.

Then a resolution-lowering (RL) procedure converts the high-resolution multi-level bitmap data 21 to low-resolution multi-level bitmap data 22 from horizontal resolution Hres1 to Hres2 and from vertical resolution Vres1 to Vres2, where Hres1≧Hres2 and Vres1≧Vres2 and Hres2×Vres2<Hres1×Vres1. Hres2 and Vres2 correspond preferably to the horizontal and vertical spatial resolution of the printer by which the document will be printed.

An image-processing (IP) step reduces the number of gradation levels from Nlev to Nlevp thereby converting the low resolution multi-level bitmap 22 to a low-gradation low-resolution output bitmap 23. Nlevp is preferebly the number of levels that can be printed with one single ink on a single pixel or microdot.

A microdot is the smallest addressable unit on the substrate to be printed by the output device or printer. The multi-level output bitmap 23 is then sent to the printer for printing.

Most documents to be printed contain a mixture of text, graphics and images and are given in the form of a page description 20. The page description 20 is device independent. To print the document the page description 20 has to be converted to a device dependent bitmap 23. The required number of pixels in the output bitmap 23 depends on the output resolution of the output device. The required number of levels for each pixel in that output bitmap 23 depends on the tone level capability of the output device. Such an output bitmap is preferably provided for each color used to print out the document.

The first step of a printing procedure according to the current invention is carried out by a RIP that transforms the page description 20 into a high-resolution multi-level bitmap 21 or rasterised data.

This is done e.g. by Adobe's Configurable PostScript Interpreter (CPSI). Horizontal and vertical resolution Hres1 and Vres1 can be specified to the RIP as well as the number of gradation levels Nlev to be used. Typically we take Nlev=256. The horizontal and vertical size Hsize and Vsize are also specified and determine the number of pixels Hnpix1 and Vnpix1 in horizontal and vertical direction.

The spatial resolution Hres and Vres for a continuous tone image may be expressed in pixels per millimeter. The spatial resolution Hres and Vres for a printing device is also expressed in pixels per millimeter, or sometimes (micro)dots per inch. A typical value for the spatial resolution of an inkjet printer is Hres2=Vres2=300 dpi (dots per inch) which corresponds to about 12 microdots per mm. This means that the inkjet device can address per linear millimeter twelve microdots. Thus per square mm (mm$^2$) a total of 144 microdots can be addressed individually. According to a preferred embodiment of the invention, the spatial resolution of the high-resolution bitmap 21 is eight times higher than that of the printing device. As such, Hres1 may take the value of 96 microdots per mm.

If the size of the printed image is known, e.g. the horizontal size Hsize=12 mm and the vertical size Vsize=20 mm, then also the number of pixels Hnpix1 and lines Vnpix1 or microdots required to represent the image at a resolution of Hres1, Vres1 by a matrix may be computed by the equations:

Hnpix1=$H$size×Hres1, Vnpix1=$V$size×Vres1.

The Nlev different gradation levels are preferably represented in the interval [0.0, 1.0] by the numbers 0.0, 1.0/(Nlev−1), 2.0/(Nlev−1), . . . , 1.0.

The second step is a resolution-lowering procedure RL. It converts the high-resolution bitmap data 21 from a first spatial resolution (Hres1, Vres1) and tonal resolution Nlev to a low-resolution bitmap 22 with second spatial resolution (Hres2, Vres2), the same tonal resolution Nlev and the same spatial dimensions Hsize$_2$=Hsize$_1$=Hsize and Vsize$_2$=Vsize$_1$=Vsize preferably in the following way:

Let $Hf$=Hres1/Hres2 and $Vf$=Vres1/Vres2 be integer numbers.

Hf is the horizontal reduction factor and Vf is the vertical reduction factor.

Let Hnpix2=$H$size×Hres2, Vnpix2=$V$size×Vres2.

Figure 2:
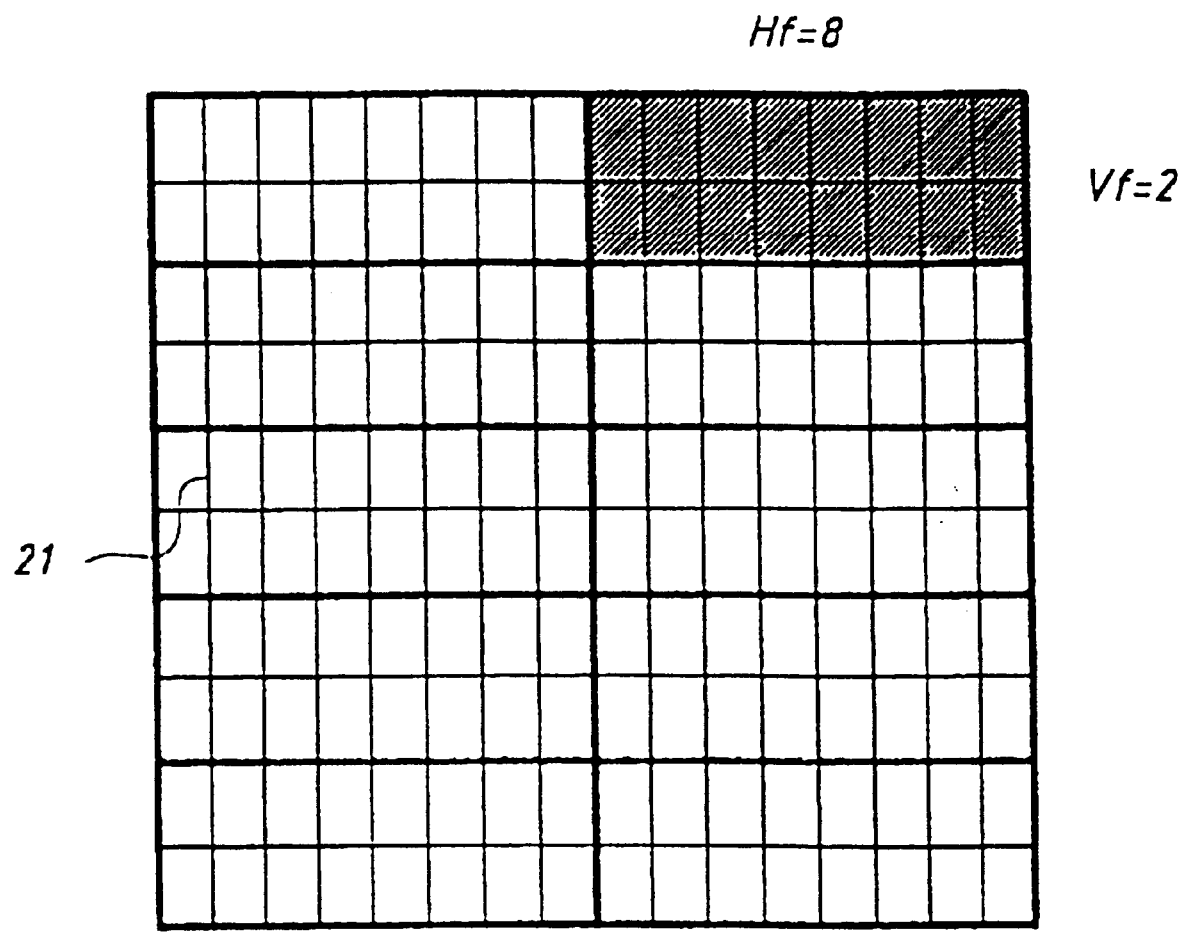
FIG. 2 shows the subdivision of a high-resolution bitmap 21 into blocks.

As shown in FIG. 2 to achieve the reduction, Hf×Vf pixels in the high-resolution (hi-res) bitmap 21 are mapped onto a single multi-level microdot. When converting, the hi-res bitmap 21 may be grouped in blocks of Hf×Vf pixels. Each block is mapped onto a pixel in the low-resolution (lo-res) bitmap 22 by the RL procedure. Preferably Hf and Vf are selected such that Hf×Vf=Nlevp−1. Nlevp is preferably the number of gradation levels of the output device. This has the following advantage:

When using reduction factors Hf and Vf, generally a rectangular area containing Hf×Vf pixels of the hi-res bitmap 21 is transformed to one pixel in the lo-res bitmap 22. The original pixels of a hi-res text normally have only minimum or maximum value, i.e. the pixel is blank or it is filled "full density". Within the hi-res rectangular area the number of pixels which can be filled, is within the range 0, 1, 2, . . . , Hf×Vf. As such Hf×Vf+1 fill values or "density" values are possible for the rectangular area.

When Hf×Vf=Nlevp−1 the fill number of the pixels within the area can simple be converted into a density level of the lo-res pixel representing the rectangular area.

Preferably the reduction factors are chosen as to comply the conditions set by the above equation. The number of achieved density levels thus determines the used reduction factors.

A few possible combinations for Nlevp, Hf and Vf that achieve the above equation are listed in the table 1 below.

TABLE 1

Choices for Hf and Vf combining with to specific Nlevp values.

| Nlevp | Hf | Vf |
|---|---|---|
| 3 | 2 | 1 |
|  | 1 | 2 |
| 4 | 3 | 1 |
|  | 1 | 3 |
| 5 | 4 | 1 |
|  | 1 | 4 |
|  | 2 | 2 |

TABLE 1-continued

Choices for Hf and Vf combining with to specific Nlevp values.

| Nlevp | Hf | Vf |
|---|---|---|
| 6 | 5 | 1 |
|   | 1 | 5 |
| 7 | 6 | 1 |
|   | 3 | 2 |
|   | 2 | 3 |
|   | 1 | 6 |
| 8 | 7 | 1 |
|   | 1 | 7 |
| 16 | 15 | 1 |
|   | 5 | 3 |
|   | 3 | 5 |
|   | 1 | 15 |

Indicating the pixels in the hi-res bitmap 21 by p(i, j), with $0 \leq i \leq Hnpix1-1$ and $0 \leq j \leq Vnpixl-1$, pixels p(i, j) for which (i div Hf)=k (j div Vf)=l for some integer numbers $0 \leq k \leq Hnpix2-1$ and $0 \leq l \leq Vnpix2-1$ are grouped in one block and will be mapped onto the pixel p(k, l) in the lo-res bitmap 22. The operation (a div b) is the result of integer division of a by b.

The block of pixels from the hi-res bitmap 21 corresponding to a pixel p(k, l) in the lo-res bitmap 22 is denoted by B(p). It is convenient to identify the pixel p(k, l) in the lo-res bitmap with the centre of its block B(p) in the hi-res bitmap. The gradation level for the pixel p(k, l) in the lo-res bitmap 22 is calculated from the pixel values in its corresponding block B(p). Preferably the gradation level Lp(k, l) for the pixel p(k, l) is taken equal to the average of the gradation levels of the pixels in B(p) or equal to the gradation level closest to this mean value.

In this way the hi-res bitmap 21 is converted to the lo-res bitmap 22, which has lower spatial resolution. When the document consists e.g. out of pure black text fonts, the hi-res bitmap 21 will only contain levels 0 and 1, but the lo-res bitmap 22 will contain also other grey levels in the range 0.0, 1.0/(Nlev−1), 2.0/(Nlev−1), . . . , 1.0.

The font edges will appear softer after this operation.

It is clear that this operation combines local averaging and subsampling, and that the local averaging operation can be replaced by other filtering methods, linear or non-linear. This is especially advantageous if the hi-res bitmap 21 contains continuous tone data values, i.e. values within the interval [0.0, 1.0]. Alternatively we may want to use a linear filter, e.g. a gaussian filter and allow the blocks to overlap. Let p represent the location 30 of the lo-res pixel (the centre of B(p)) and q represent the location of a hi-res pixel in block B(p). W represents a weight function. By linear filtering or convolution is meant a mathematical operation that produces a weighted local average value $\overline{L}$ of the pixel values Lq in the hi-res block B(p) i.e.:

$$\overline{L} = \left( \sum_{q \text{ in } B(p)} W(q-p) L_q \right)$$

Preferably for the weights W(q−p), $0 \leq W(q-p) \leq 1.0$ and $\Sigma W(q-p)=1.0$ but W(q−p) may also take negative values. W is called the filter or convolution mask.

A gaussian filter is a linear filter for which the weights Wq have gaussian values e.g. $W(q-p)=t.\exp(-q-p^2/s)$, with t and s scaling factors, q−p is equal to the distance between p and q.

Instead of taking a linear function to obtain $\overline{L}$, a non-linear function is also conceivable. An example of such a non-linear function is median filtering of the values of the block. More detailed information can be found in "A simplified approach to image processing, Randy Crane, Prentice Hall, New Jersey (1997)".

In fact, these operations are all special cases of the more general procedure of resampling.

According to the sampling theory, to regain a continuous signal from its sampled version, it is advantageous to pass this signal through an ideal low-pass filter, to reconstruct the continuous signal exactly when this continuous signal is band-limited in frequency space. Since images are always limited in spatial extent, they can never really be band-limited in frequency space, but low-pass filtering nevertheless provides an approximation of the continuous signal. To resample a signal, the appropriate strategy is to first try to approximate the continuous signal and then sample this continuous signal.

The RL process described herein above amounts thus to low-pass filtering followed by sampling.

When the operation is viewed in this way, there is no need to restrict the method according to the current invention to the case where Hf=Hres1/Hres2 and Vf=Vres1/Vres2 are integer numbers and Hf×Vf=Nlevp−1.

The sampling operation can be interpreted as a geometric shrinking of the image wherein a pixel (i, j) is mapped onto (k, l)=(i/Hf, j/Vf). But in general k and l are not integer values. To determine the pixel value for a pixel(k, l) of the sampled image interpolation between the pixels lying close to (Hf*k, Vf*l) in the hi-res image is advantageous. To this end nearest neighbour interpolation, bilinear interpolation, bicubic interpolation, etc. may be used. These techniques are described in the book by "Crane" referred to before.

A possible draw-back of this procedure is the following. Most conversions from abstract page data to bitmap characters use so-called font hinting. This font hinting guarantees that vertical or horizontal lines within the same character and among different characters are all equally thick, e.g. all three stems in the letter 'm' are equally thick, and they are equally thick as the stems of the letter 'n'. The conservation of this property is not guaranteed by the above procedure. In practice however, this seems to be not of major importance, and the benefits of the current procedure outweigh this possible drawback.

Moreover, there is the possibility in the algorithm to choose Hf and Vf (see table 1). For Nlevp=4, one can choose Hf=3, Vf=1 or Hf=1, Vf=3. The first option will guarantee the vertical stems to remain balanced, while the latter option keeps the horizontal stems, e.g. in the letter 'E', balanced. Alternatively, the chosen low-pass filter involved in the above described resampling procedure can be larger in the horizontal direction than in the vertical direction or vice versa.

The above resampling operation can be followed by an additional non-linear mapping from 0.0, 1.0/(Nlev−1), 2.0/(Nlev−1), . . . , 1.0 to 0.0, 1.0/(Nlev−1), 2.0/(Nlev−1), . . . , 1.0. This mapping can compensate for the fact that the multiple levels, which the printer is capable to produce, are not necessarily linearly related in luminance. For color documents, it is not necessary to treat all bitmaps of the color separation in the same way. The above outlined procedure can e.g. be applied to the bitmaps in the color separation using different block sizes and number of levels for different bitmaps, only to the black component, etc.

A third step in the printing process according to an embodiment of the current invention is an image-processing step that reduces the number of gradation levels from Nlev to Nlevp and which converts (IP) the lo-res high-gradation multi-level bitmap 22 into a lo-res output bitmap 23. Nlevp is preferably the number of levels that can be printed with one ink on a single pixel or microdot. For this conversion (IP) one can use a multi-level screening procedure or multi-level error diffusion.

Figure 3:
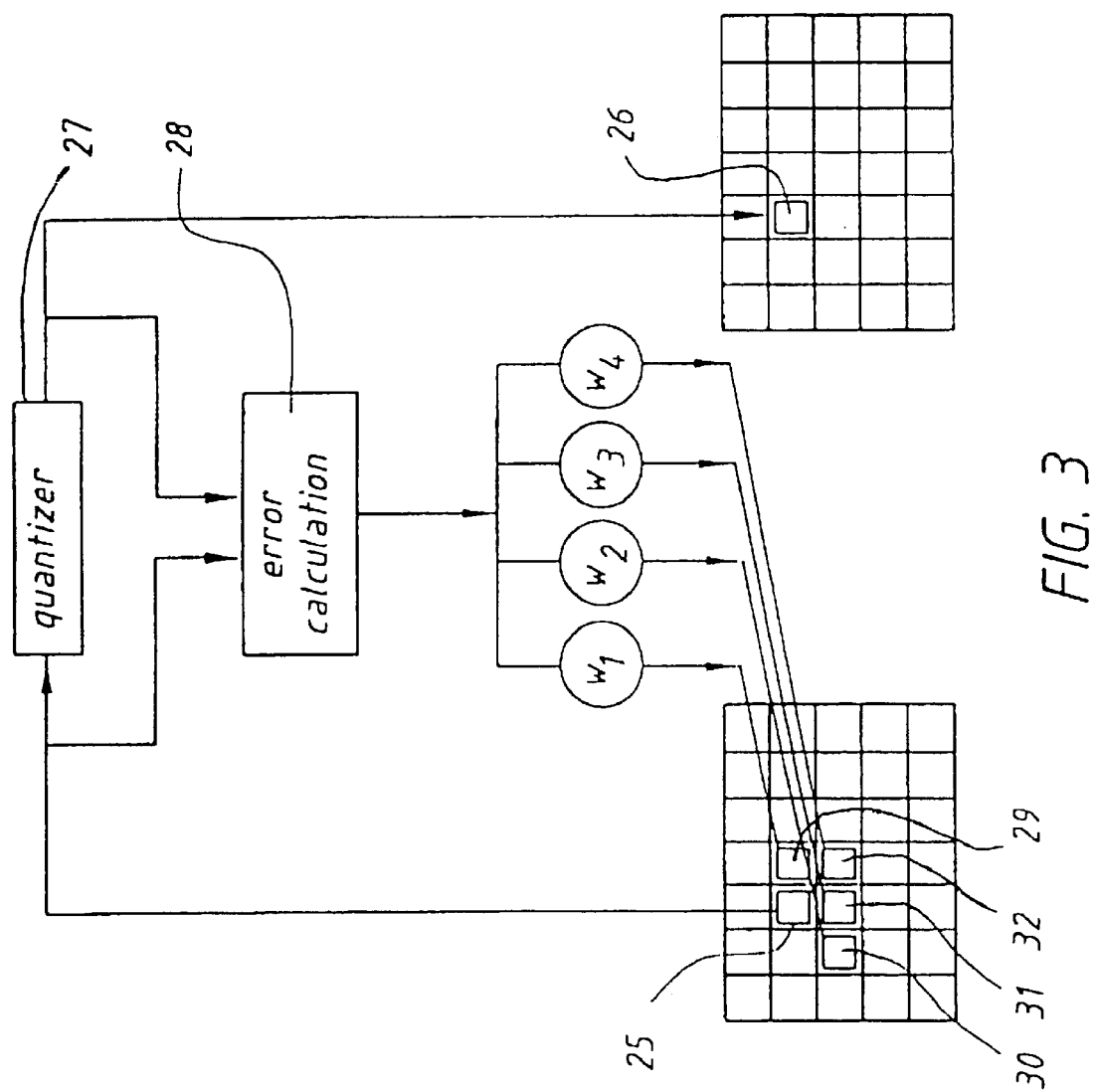
FIG. 3 illustrates multi-level error diffusion.

An example of multi-level error diffusion is multi-level Floyd-Steinberg error diffusion, an extension of the algorithm by Floyd and Steinberg, see FLOYD R W and STEINBERG L, An adaptive algorithm for spatial grey scale, Society for Information Display 1975 Symposium Digest of Technical Papers, 36–37 (1975) herein incorporated by reference. In this algorithm the image pixels are processed in a sequential way. As shown in FIG. 3 a pixel value 25 in the range 0.0, 1.0/(Nlev−1), 2.0/(Nlev−1), ..., 1.0 is set to its nearest value for the output 26 in the range 0.0, 1.0/(Nlevp−1), 2.0/(Nlevp−1), ..., 1.0 by quantizer 27. The error made by this quantisation is calculated by the error calculation circuit 28 and is distributed over its neighbours 29, 30, 31, 32 that have not yet been processed.

An alternative way to reduce the number of gradation levels is the use of binary or multi-level screening techniques instead of error diffusion.

Figure 4:
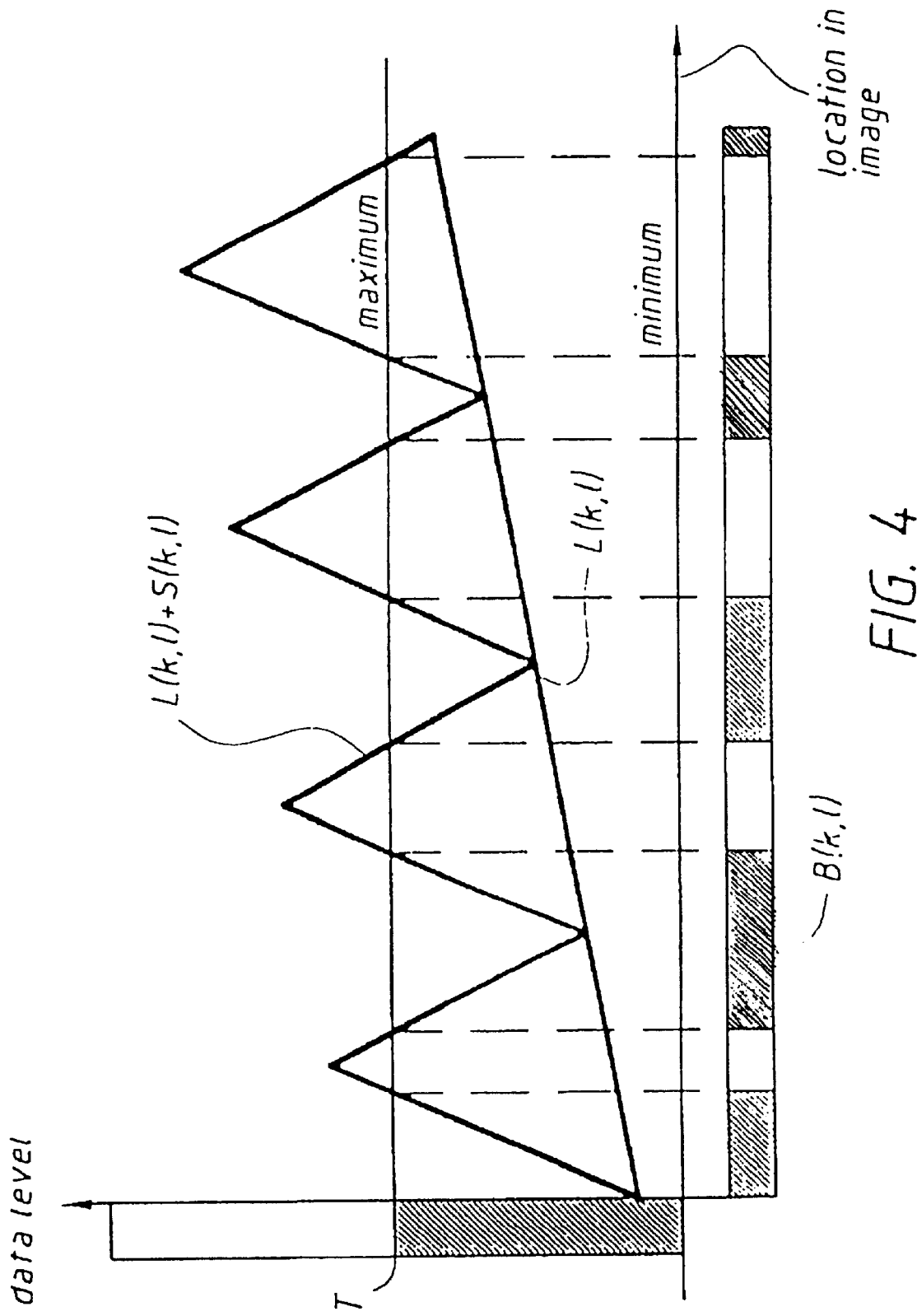
FIG. 4 shows how a screening function S (k, l) is superposed on the continuous tone pixel L (k, l) data and is thresholded to get bi-level output B (k, l).

As shown in FIG. 4 screening may be performed by defining a (preferably periodic) screen function $S(k, l)$ and adding this function to the pixel data level $L(k, l)$ that is to be screened. The result of this addition $L(k, l)+S(k, l)$ is then thresholded by a constant function T to yield binary pixel values $B(k, l)$. When e.g. both the screen function $S(k, l)$ and pixel data levels $L(k, l)$ take values in [0,1], the following binary value $B(k, l)$ may be assigned to the pixel $(k, l)$ $$B(k,l)=1 \text{ if } L(k,l)+S(k,l) \geq 1,$$

$$B(k,l)=0 \text{ if } L(k,l)+S(k,l)<1.$$

For clarity in FIG. 4, the screening operation $S(k, l)$ is represented in only one dimension instead of two.

Figure 5:
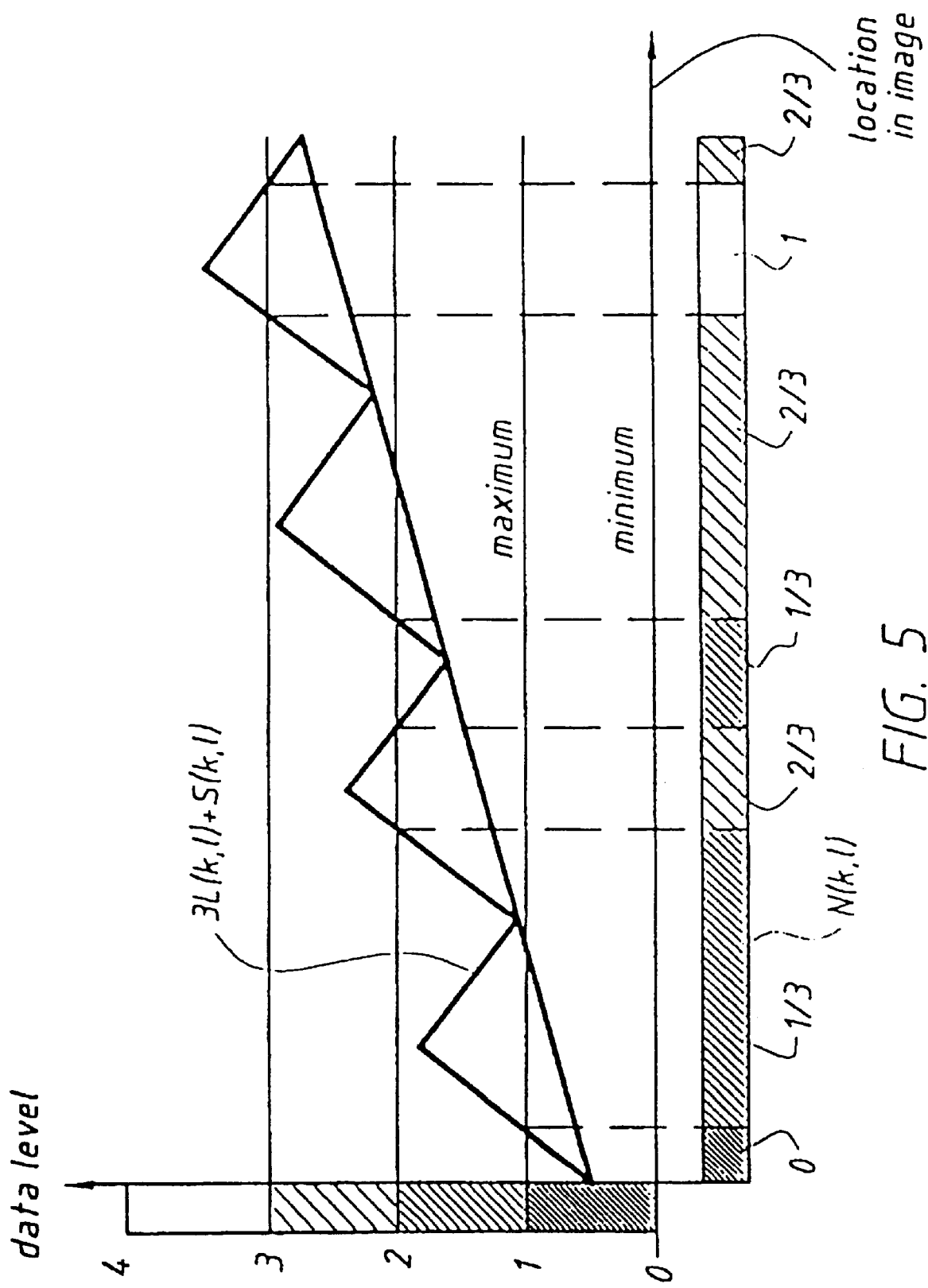
FIG. 5 shows multi-level screening using one screening function S (k, l).

This procedure can be extended to multi-level screening in the following way:

In FIG. 5 the situation is shown for mapping continuous tone pixel data $L(k, l)$ $(0 \leq L(k, l) \leq 1)$ to 4-level data $N(k, l) = 0, \frac{1}{3}, \frac{2}{3}, 1$ by using a screen function $S(k, l)$ $(0 \leq S(k, l) \leq 1)$ $$N(k,l)=0 \text{ if } 0 \leq 3.L(k,l)+S(k,l)<1$$

$$N(k,l)=\frac{1}{3} \text{ if } 1 \leq 3.L(k,l)+S(k,l)<2$$

$$N(k,l)=\frac{2}{3} \text{ if } 2 \leq 3.L(k,l)+S(k,l)<3$$

$$N(k,l)=1 \text{ if } 3 \leq 3.L(k,l)+S(k,l) \leq 4$$

More generally, suppose that continuous tone pixel data $L(k, l)$ must be mapped to N-level data $N(k, l)$ $(0, 1/(N-1), 2/(N-1), 1)$ by using a screen function $S(k, l)$ $(0 \leq S(k, l) \leq 1)$, $N(k, l)$ can be calculated as follows:

let $K \in \{0,1,2, \ldots, N-1\}$, $$0 \leq L(k,l) \leq 1$$

and $$0 \leq S(k,l) \leq 1$$

$$N(k,l)=K/(N-1) \text{ if } K \leq (N-1)L(k,l)+S(k,l) \leq K+1,$$

$$N(k,l)=1 \text{ if } L(k,l)=S(k,l)=1.$$

This is illustrated in FIG. 5 where N=4.

Alternatively, it is possible to use N−1 screening functions $S_1, \ldots, S_{N-1}$, chosen such that for all pixels (k, l)

$$S_1(k,l)<S_2(k,l)<\ldots<S_{N-1}(k,l)$$

and to assign $$N(k,l)=0 \text{ if } L(k,l)+S_1(k,l)<1,$$

$$N(k,l)=K/(N-1) \text{ if } L(k,l)+S_j(k,l) \geq 1, \text{ only for } j=1,2,\ldots,K.$$

Figure 6:
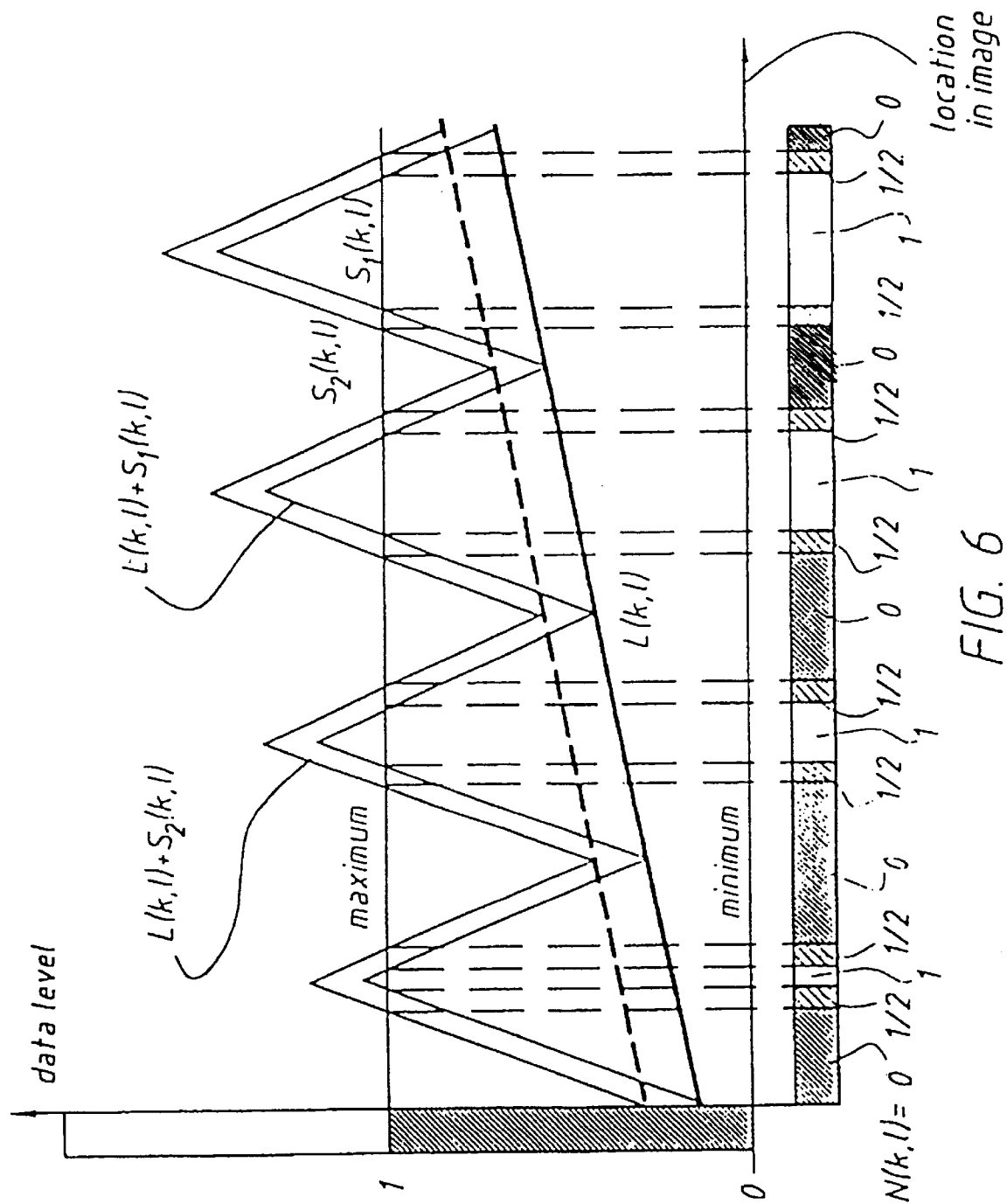
FIG. 6 shows how three-level screening with two screening functions can be done.

This procedure is illustrated in FIG. 6 for N=3 (three levels 0, ½, 1, two screening functions $S_1(k, l)$, $S_2(k, l)$).

The fourth step is the printing of the output bitmap by a multi-level reproduction device such as an ink-jet printing head. Printing heads exist today that can deliver variable drop sizes of a single ink, thereby giving the opportunity to create multiple grey or color levels. The XaarJet 500 printheads, which are available in binary and greyscale versions are an example of these. The printhead specification includes a printing width of 70 mm with 500 nozzles, and a printing resolution of 180 dpi (7 dots/mm) or 360 dpi (14 dots/mm).

The image processing procedures as outlined in the first three steps can be combined with a printing step by such a printhead to print out the obtained multi-level bitmap data. This technique may also be used in electrographic or electrophotographic printers having multi-level capabilities as described e.g. in EP 0 634 862.

Figures 7A, 7B, 7C:
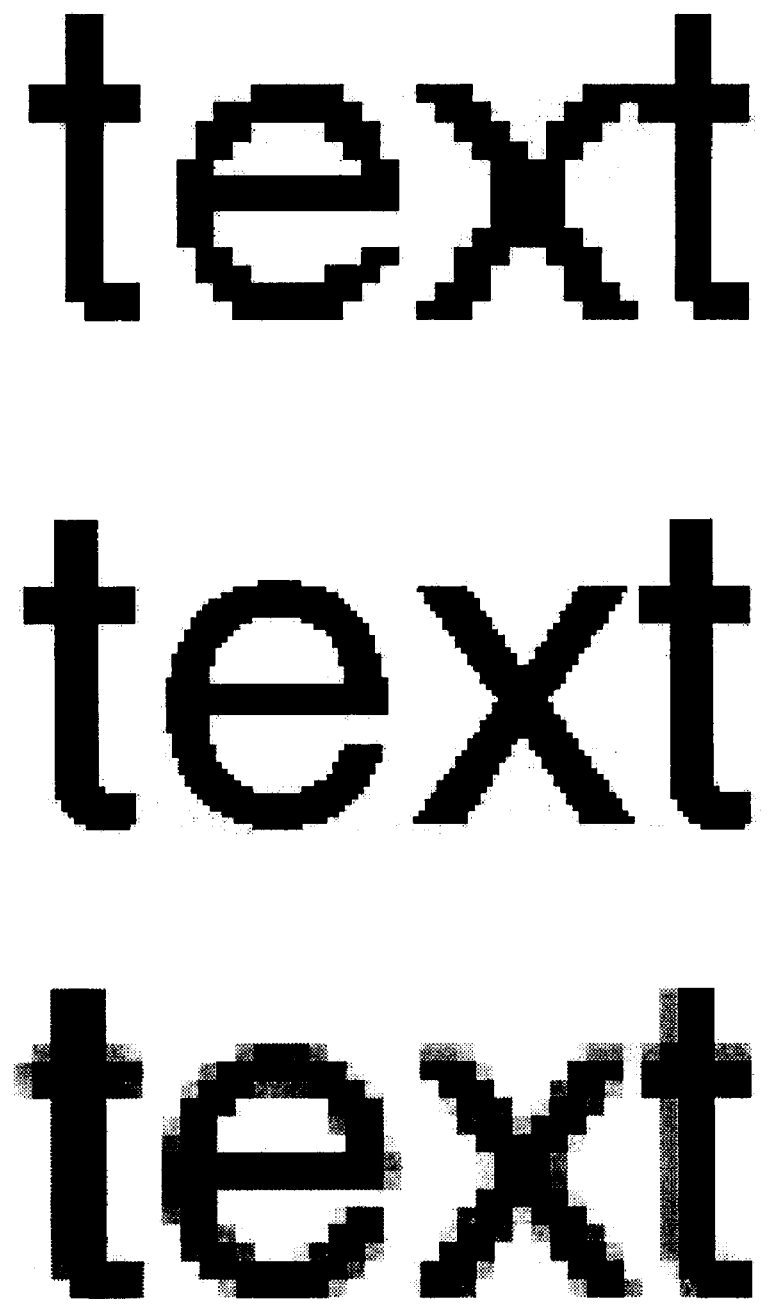

FIG. 7a–7c give an example of the effect of the different methods used in the process on a text sample.

FIG. 7a depicts the text sample as it would be printed without making use of the present invention. The page data is converted to a lo-res bitmap and the text is merely printed by the low resolution printhead using binary microdots. The binary dots can only have minimum and maximum density. This gives an unfavourable result with dominant aliasing distortion.

FIG. 7b gives the image obtained after the first step of the method, i.e. the page data is converted to a hi-res, multi-level bitmap. In this example the hi-res bitmap has a resolution three times higher in the horizontal and the vertical direction. The microdots still show only two levels, i.e. the minimum and maximum density because the text in page data corresponds to a black text on a white background. This image exists only in an electronic form and can not be printed out by the low-res printhead. Although the bitmap is multi-level, the microdots only take the minimum and maximum density value.

In the second step the multi-level bitmap is converted to a multi-level bitmap (Nlev levels) at the resolution of the printhead. The horizontal and vertical reduction factor is set to 3. This is not shown in a figure.

In the third step the number of levels of the multi-resolution bitmap is reduced to the number of levels (here Nlevp=10 levels) which can be printed by the printhead. To obtain an easy conversion, the reduction factors Hf and Vf and Nlevp fulfil the requirements of Hf×Vf=Nlevp−1 (3×3=10−1).

The obtained lo-res, multi-level bitmap can be printed by the printhead resulting in the image of FIG. 7c. As can be seen an optimum use is made of the printhead's multi-level capability in combination with the resolution of the printer. Due to this method a smoother image is obtained avoiding aliasing effects.

Those skilled in the art will appreciate that numerous modifications and variations may be made to the above disclosed embodiments without departing from the spirit and scope of the present invention.

We claim:

1. A method for rendering an image comprising the steps of:

converting page data to a high-resolution multi-level bitmap, comprising pixels p(i, j), said high-resolution bitmap having a vertical resolution Vres1 and a horizontal resolution Hres1; and having more than two possible graduation levels;

converting the high-resolution multi-level bitmap to a low-resolution multi-level bitmap comprising pixels p(k, l), and having a vertical resolution Vres2 and a horizontal resolution Hres2 and having more than two possible graduation levels;

rendering the low-resolution multi-level bitmap with a multi-level output device;

wherein

Hres1≧Hres2;

Vres1≧Vres2;

and

Hres2×Vres2<Hres1×Vres1.

2. The method according to claim 1 wherein said high-resolution multi-level bitmap and said low-resolution multi-level bitmap have Nlev gradation levels and wherein the step of rendering said low-resolution multi-level bitmap further comprises the steps of:

processing the low-resolution multi-level bitmap to reduce the number of gradation levels Nlev to a number of gradation levels Nlevp to obtain an low-gradation, low-resolution output bitmap wherein Nlev>Nlevp;

printing said output bitmap on said output device.

3. The method according to claim 1 wherein the low-resolution multi-level bitmap is a resampled version of the high-resolution multi-level bitmap.

4. The method according to claim 1 wherein the gradation level of said pixel p(k, l) is determined by a local average of the gradation levels of pixels p(i, j).

5. The method according to claim 1 wherein the gradation level of said pixel p(k, l) is determined by a weighted local average, using a linear filter function or convolution mask, of the gradation levels of pixels p(i, j).

6. The method according to claim 1 wherein the gradation level of pixel p(k, l) is determined by a non-linear filter function of the gradation levels of pixels p(i, j).

7. The method according to claim 1 wherein the multi-level output device is an inkjet printer.

8. A method for rendering an image comprising the steps of:

converting page data to a high-resolution multi-level bitmap, comprising pixels p(i, j), said high-resolution bitmap having a vertical resolution Vres1 and a horizontal resolution Hres 1;

converting the high-resolution multi-level bitmap to a low-resolution multi-level bitmap, comprising pixels p(k, l), and having a vertical resolution Vres2 and a horizontal resolution Hres2, wherein said high-resolution multi-level bitmap and said low-resolution multi-level bitmap have Nlev gradation levels, and wherein Hres 1 Hres2, Vresl≧Vres2, and Hres2×Vres2<Hres1×Vres1;

rendering the low-resolution multi-level bitmap with a multi-level output device by processing the low-resolution multi-level bitmap to reduce the number of gradation levels Nlev to a number of gradation levels Nlevp to obtain an low-gradation, low-resolution output bitmap wherein Nlev >Nlevp and printing said output bitmap on said output device;

defining a horizontal reduction factor Hf, $$Hf = \frac{Hres1}{Hres2};$$

defining a vertical reduction factor Vf, $$Vf = \frac{Vres1}{Vres2};$$

and selecting Nlevp such that Hf×Vf=Nlevp−1.

9. The method according to claim 8 wherein the reduction factors Hf and Vf have integer values.

10. A method for rendering a color image from a plurality of color bitmaps wherein at least one color bitmap is processed by a method comprising the steps of:

converting page data to a high-resolution multi-level bitmap comprising pixels p(i, j), said high-resolution bitmap having a vertical resolution Vres1 and a horizontal resolution Hres1; said high-resolution multi-level bitmap having more than two possible graduation levels;

converting the high-resolution multi-level bitmap to a low-resolution multi-level bitmap comprising pixels p(k, l), said low-resolution bitmap having a vertical resolution Vres2 and a horizontal resolution Hres2 and having more than two possible graduation levels;

converting the high-resolution multi-level bitmap to a low-resolution multi-level bitmap comprising pixels p(k, f), said low-resolution bitmap having a vertical resolution Vres2 and a horizontal resolution Hres2 and having more than two possible graduation levels;

rendering the low-resolution multi-level bitmap with a multi-level color output device;

Hres1≧Hres2;

Vres1≧Vres2;

and

Hres2×Vres2<Hres1×Vres1.

11. The method according to claim 10 wherein said high-resolution bitmap and said low-resolution multi-level bitmap have Nlev gradation levels and wherein the step of rendering said low-resolution multi-level bitmap further comprises the steps of:

processing the low-resolution multi-level bitmap to reduce the number of gradation levels Nlev to a number of gradation levels Nlevp to obtain an a low-gradation, low resolution output bitmap wherein Nlev >Nlevp; and printing said output bitmap on said color output device.

12. The method according to claim 10 wherein the low-resolution multi-level bitmap is a resampled version of the high-resolution multi-level bitmap.

13. The method according to claim 10 wherein the gradation level of said pixel p(k, l) is determined by a local average of the gradation levels of pixels p(i, j).

14. The method according to claim 10 wherein the gradation level of said pixel p(k, l) is determined by a weighted local average, using a linear filter function or convolution mask, of the gradation levels of pixels p(i, j).

15. The method according to claim 10 wherein the gradation level of pixel p(k, l) is determined by a non-linear filter function of the gradation levels of pixels p(i, j).

16. The method according to claim 10 wherein the multi-level output device is a color inkjet printer.

17. A method for rendering a colour image from a plurality of colour bitmaps wherein at least one colour bitmap is processed by a method comprising the step of:

converting page data to a high-resolution, multi-level bitmap comprising pixels p(i, j), said high-resolution bitmap having a vertical resolution Vresl and a horizontal resolution Hres 1:

converting the high-resolution multi-level bitmap to a low-resolution multi-level bitmap comprising pixels p(k, l), said low-resolution bitmap having a vertical resolution Vres2 and a horizontal resolution Hres2, wherein said high-resolution bitmap and said low-resolution multi-level bitmap have Nlev gradation levels, and wherein Hresl Hres2, Vresl Vres2, and Hres2×Vres2 <Hresl×Vresl:

rendering the low-resolution multi-level bitmap with a multi-level color output device by Processing the low-resolution multi-level bitmap to reduce the number of gradation levels Nlev to a number of gradation levels Nlevp to obtain a low-gradation, low resolution outiut bitmap wherein Nlev >Nlevp and Printing said output bitmap on said color outnut device;

defining a horizontal reduction factor Hf, $$Hf = \frac{Hres1}{Hres2};$$

defining a vertical reduction factor Vf, $$Vf = \frac{Vres1}{Vres2};$$

and selecting Nlevp such that Hf×Vf=Nlevp−1.

18. The method according to claim 17 wherein the reduction factors Hf and Vf have integer values.

19. A system for rendering an image from page data comprising:

a convertor for converting said page data to a high resolution multi-level bitmap comprising pixels p(i, j) and said high-resolution bitmap having a vertical resolution Vres1 and a horizontal resolution Hres1, and said high-resolution bitmap having more than two possible gradation levels;

a convertor for converting the high-resolution multi-level bitmap to a low-resolution multi-level bitmap comprising pixels p(k, l), and said low-resolution multi-level bitmap comprising pixels p(k, l) and having more than two possible gradation levels and said low-resolution bitmap having a vertical resolution Vres2, a horizontal resolution Hres2 wherein Hres1≧Hres2;

Vres1≧Vres2; and

Hres2×Vres2<Hres1×Vres1, and a multi-level output means for rendering the low-resolution multi-level bitmap.

* * * * *